United States Patent
Decker et al.

(10) Patent No.: US 12,157,443 B2
(45) Date of Patent: Dec. 3, 2024

(54) AUXILIARY BRAKE SYSTEM FOR OUTDOOR GROUNDS MAINTENANCE VEHICLES HAVING HYDROSTATIC TRACTION DRIVE SYSTEMS

(71) Applicant: The Toro Company, Bloomington, MN (US)

(72) Inventors: Matthew J. Decker, Lakeville, MN (US); Luke R. Nahorniak, Lakeville, MN (US); John B. Heckel, Shakopee, MN (US)

(73) Assignee: The Toro Company, Bloomington, MN (US)

(*) Notice: Subject to any disclaimer, the term of this patent is extended or adjusted under 35 U.S.C. 154(b) by 1104 days.

(21) Appl. No.: 16/322,753

(22) PCT Filed: Aug. 2, 2017

(86) PCT No.: PCT/US2017/045094
§ 371 (c)(1),
(2) Date: May 13, 2021

(87) PCT Pub. No.: WO2018/026915
PCT Pub. Date: Feb. 8, 2018

(65) Prior Publication Data
US 2021/0289700 A1    Sep. 23, 2021

Related U.S. Application Data

(60) Provisional application No. 62/370,940, filed on Aug. 4, 2016.

(51) Int. Cl.
*B60T 1/093* (2006.01)
*B60K 7/00* (2006.01)
(Continued)

(52) U.S. Cl.
CPC ............ *B60T 1/093* (2013.01); *B60K 7/0015* (2013.01); *B60T 8/32* (2013.01); *B60T 8/3215* (2013.01);
(Continued)

(58) Field of Classification Search
CPC ......... B60K 7/0015; B60T 1/02; B60T 1/087; B60T 1/093; B60T 8/32; B60T 8/3215;
(Continued)

(56) References Cited

U.S. PATENT DOCUMENTS 3,981,374 A * 9/1976 Johns, Jr. .............. E02F 3/6481
60/449
4,528,871 A * 7/1985 Nembach .............. F16H 61/444
180/242
(Continued)

FOREIGN PATENT DOCUMENTS

CN    202266536 U * 6/2012 .............. F15B 13/06
CN    204253487 U * 4/2015 .............. F15B 13/06
(Continued)

OTHER PUBLICATIONS

International Search Report and Written Opinion for Application No. PCT/US2017/045094 mailed Oct. 26, 2017.

*Primary Examiner* — Arpad Fabian-Kovacs
(74) *Attorney, Agent, or Firm* — Merchant & Gould P.C.

(57) ABSTRACT

An outdoor grounds maintenance vehicle is self-propelled by a hydrostatic traction drive system that provides dynamic braking to the vehicle without the need for separate service brakes acting on the wheels of the vehicle. An engine kill device can be manually actuated by the operator to access the dynamic braking of the traction drive system by reducing the speed of the prime mover that powers the pump of the traction drive system. This provides an auxiliary braking system that can be used in an emergency or on demand by (Continued)

the operator in the event the accelerator pedal does not properly control the pump swashplates. The operator can control the rate at which the auxiliary brake system reduces the speed of the prime mover to zero.

17 Claims, 2 Drawing Sheets

(51) Int. Cl.
```
B60T 8/32      (2006.01)
B60T 10/04     (2006.01)
B60T 15/04     (2006.01)
F01L 9/10      (2021.01)
F01L 13/06     (2006.01)
F02D 13/04     (2006.01)
A01D 34/00     (2006.01)
A01D 34/66     (2006.01)
A01D 34/82     (2006.01)
A01D 101/00    (2006.01)
B60T 1/02      (2006.01)
B60T 1/087     (2006.01)
B60T 13/58     (2006.01)
B60T 15/22     (2006.01)
```
(52) U.S. Cl.
CPC ............ B60T 10/04 (2013.01); B60T 15/041 (2013.01); F01L 9/10 (2021.01); F01L 13/065 (2013.01); F02D 13/04 (2013.01); A01D 34/006 (2013.01); A01D 34/66 (2013.01); A01D 34/828 (2013.01); A01D 2101/00 (2013.01); B60T 1/02 (2013.01); B60T 1/087 (2013.01); B60T 13/585 (2013.01); B60T 13/586 (2013.01); B60T 15/048 (2013.01); B60T 15/22 (2013.01)

(58) Field of Classification Search
CPC ...... B60T 10/04; B60T 13/586; B60T 15/041; B60T 15/048; B60T 15/22; A01D 34/006; A01D 34/66; A01D 34/828; A01D 69/10; A01D 2101/00; B60Y 2200/223; F01L 9/10; F01L 13/065; F16D 57/06; F02D 13/04

See application file for complete search history.

(56) References Cited

U.S. PATENT DOCUMENTS

| | | | |
|---|---|---|---|
| 4,635,743 A * | 1/1987 | Riehl | B60K 23/08 180/243 |
| 5,337,543 A | 8/1994 | Kitamura et al. | |
| 5,489,007 A * | 2/1996 | Yesel | F16H 61/4157 303/190 |
| 5,683,322 A * | 11/1997 | Meyerle | B60W 10/10 475/72 |
| 5,848,520 A | 12/1998 | Arfstrom et al. | |
| 6,056,074 A | 5/2000 | Heal et al. | |
| 6,109,009 A * | 8/2000 | Benson | B60L 58/21 56/10.2 G |
| 7,266,938 B1 * | 9/2007 | Hauser | A01D 34/64 56/11.8 |
| 9,002,585 B2 | 4/2015 | Porter et al. | |
| 10,058,031 B1 * | 8/2018 | Brown | B60K 17/14 |
| 2010/0307843 A1 * | 12/2010 | Lawson, Jr. | B62D 11/04 180/242 |
| 2014/0187381 A1 | 7/2014 | Dix et al. | |
| 2014/0219848 A1 * | 8/2014 | Rabhi | F04B 11/0016 418/24 |
| 2016/0177844 A1 | 6/2016 | Fuentes Utrilla et al. | |
| 2017/0259798 A1 * | 9/2017 | Toole | B60T 13/14 |
| 2021/0339730 A1 * | 11/2021 | Gapinski | B60T 1/093 |

FOREIGN PATENT DOCUMENTS

| | | | | |
|---|---|---|---|---|
| CN | 205311729 U | * | 6/2016 | ............ B62D 55/30 |
| CN | 206246444 U | * | 6/2017 | ............ F15B 11/22 |
| CN | 106402067 B | * | 1/2018 | ............ F15B 11/22 |
| CN | 108184353 A | * | 6/2018 | ............ A01B 51/02 |
| CN | 112238845 A | * | 1/2021 | ............ B60T 10/04 |
| EP | 0329045 A2 | * | 8/1989 | ............ B60K 41/24 |
| EP | 0347804 A1 | * | 12/1989 | ......... B60K 17/356 |
| EP | 0743219 A1 | * | 11/1996 | ......... B60K 17/356 |
| EP | 2130709 A1 | * | 12/2009 | ............ A01D 34/69 |
| KR | 20110012839 A | * | 2/2011 | ............... F01L 1/18 |
| RU | 2708497 C1 | * | 12/2019 | ............... B60F 3/00 |
| WO | WO-0230698 A1 | * | 4/2002 | ......... B60K 17/046 |
| WO | WO-2010048561 A2 | * | 4/2010 | ......... A01D 34/006 |
| WO | WO-2014122323 A1 | * | 8/2014 | ......... B60K 17/344 |
| WO | WO-2016201552 A1 | * | 12/2016 | ............. B60K 6/12 |

\* cited by examiner

AUXILIARY BRAKE SYSTEM FOR OUTDOOR GROUNDS MAINTENANCE VEHICLES HAVING HYDROSTATIC TRACTION DRIVE SYSTEMS

TECHNICAL FIELD

This invention relates to the field of outdoor grounds maintenance vehicles, such as mowers, sprayers, aerators and the like. More particularly, this invention relates to such vehicles that use hydrostatic traction drive systems for self-propulsion.

BACKGROUND OF THE INVENTION

Hydrostatic traction drive systems are often used for self-propelling many types of outdoor grounds maintenance vehicles due to a number of desirable inherent characteristics. Such a drive system includes at least one hydraulic pump driven by a prime mover such as an internal combustion engine, electric motor or engine/electric hybrid configuration. The pump supplies a flow of pressurized fluid to at least one hydraulic motor that is operatively connected to one or more ground engaging drive wheels. The pump has a pivotal swashplate that has neutral, forward, and reverse positions as set by the operator using a hand lever or foot pedal accelerator control. This allows variable speed operation of the vehicle in forward and reverse directions pursuant to the direction and angle that the swashplate has been pivoted out of neutral in accordance with the operator selected setting of the accelerator control.

Dynamic braking is another inherent and desirable characteristic of hydrostatic traction drive systems. When the operator returns the accelerator control towards neutral or all the way to neutral from a forward or reverse drive position, the swashplate is moved towards neutral or all the way back to neutral as well permitting less or no fluid flow, respectively, through the system. In this case, the inertia of the rotating vehicle drive wheel(s) connected to the drive motor causes the drive motor to act as a pump attempting to maintain fluid flow through the system at a higher rate than is now permitted by the retarded or neutral position of the swashplate. However, this is impossible and the drive wheel(s) and the drive motor powering them must inherently slow down to whatever slower speed is permitted by a retarded but partially open swashplate or to a full stop if the swashplate was returned all the way to neutral. This is what is known as dynamic braking in a hydrostatic traction drive system.

Many grounds maintenance vehicles are not propelled at very high ground speeds. Typically, such vehicles when working in an operational mode to perform whatever ground maintenance tasks for which they were designed travel at very low ground speeds, e.g. 0 to 11 mph. Such vehicles can be driven at higher ground speeds in a transport mode when they are not performing such tasks, but even then the transport speeds are quite modest, e.g. 0 to 20 mph. Moreover, for the most part, such vehicles are not driven long distances on public roadways. Thus, for many such vehicles, the dynamic braking effect provided by their hydrostatic traction drive systems is more than adequate to act as the service brake system. Accordingly, there are often no separate wheel engaging service brakes on such vehicles since such separate service brakes are not needed. However, such vehicles do carry a separate parking brake system that can be engaged to hold the vehicle in a stationary position after it has been brought to a stop.

In some political jurisdictions, there are regulations that require that an auxiliary brake system be included in grounds maintenance vehicles that rely on hydrostatic dynamic braking for use in the event that there is some failure in the dynamic braking. While rare, such failures can occur if the swashplate does not respond to the accelerator control and remains at a previously open position even though the operator is trying to close the swashplate by partially or fully returning the accelerator control towards neutral. In some jurisdictions requiring such an auxiliary brake system, there is a further requirement that the system be graduated so that an operator has some control over the operation of the auxiliary brake system rather than having the system simply be either off or on. The operator must be able to graduate or moderate the braking action provided by the auxiliary brake system so that the rate of brake application is under the operator's control.

In the past, it has been possible to meet the above noted requirements through the momentary application of the parking brake system. In many grounds maintenance vehicles of the type under consideration herein, the parking brakes comprised friction type disc brakes that could be applied through the application of a foot pedal or some other control available to the operator. Thus, in the event of a loss of dynamic braking, the operator could depress the parking brake foot pedal, either by pumping the pedal or by fully depressing and holding the pedal, to cause the parking brake to first slow and then bring the vehicle to a stop. However, the parking brake system in such vehicles is not designed for braking a moving vehicle in this manner. When the parking brake system is used for this purpose, the vehicle stopping distance increases beyond what would normally be provided by dynamic braking. Moreover, undue wear and damage to the parking brake system might occur after one or just a few uses of the parking brake system for this purpose.

Accordingly, it would be advantageous to find an alternative way to provide a graduated auxiliary brake system in ground maintenance vehicles of this type.

SUMMARY OF THE INVENTION

One aspect of this invention relates to an outdoor grounds maintenance vehicle which comprises a frame supported for movement over a ground or turf surface by a plurality of ground engaging wheels. The frame carries a prime mover, a throttle for establishing a rotational speed of the prime mover, a seat for an operator, and an implement for performing a grooming or working operation on the ground or turf surface. A hydrostatic traction drive system is powered by the prime mover and operatively coupled to at least one wheel for self-propulsion of the frame over the ground or turf surface. The drive system provides hydrostatic dynamic braking for slowing or stopping the frame during operation of the vehicle. An auxiliary brake system is provided having a prime mover kill device that is separate from the throttle. The auxiliary brake system provides graduated control by the operator of the rotational speed of the prime mover to reduce the rotational speed of the prime mover from a predetermined value as established by the throttle.

BRIEF DESCRIPTION OF THE DRAWINGS

This invention will be described more fully in the following Detailed Description, when taken in conjunction with the drawings, in which like reference numerals refer to like elements throughout.

DETAILED DESCRIPTION

Figure 1:
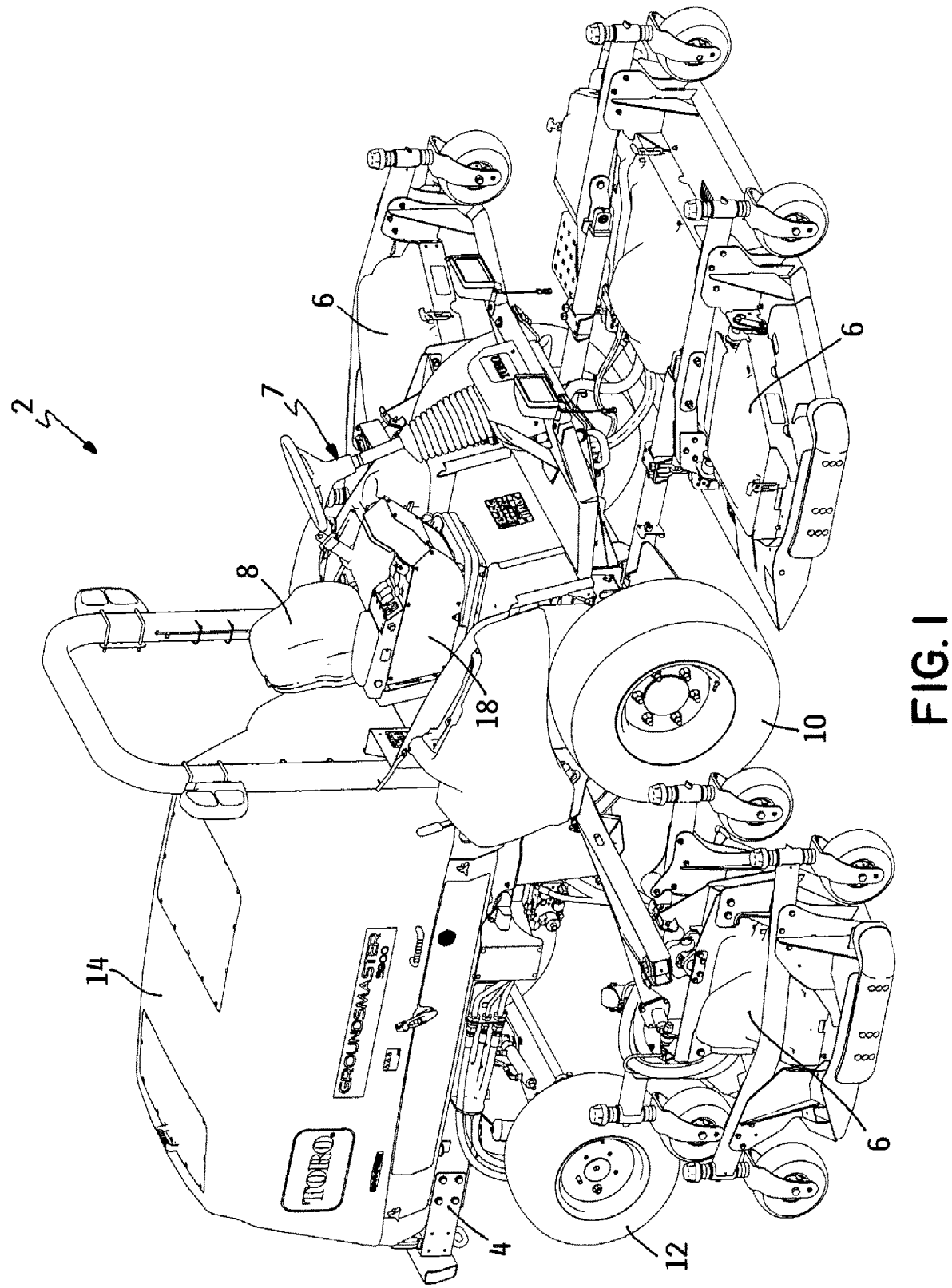
FIG. 1 is a perspective view of one type of outdoor grounds maintenance vehicle, namely a gang mower, with which the auxiliary brake system of this invention can be used.
Figure 2:
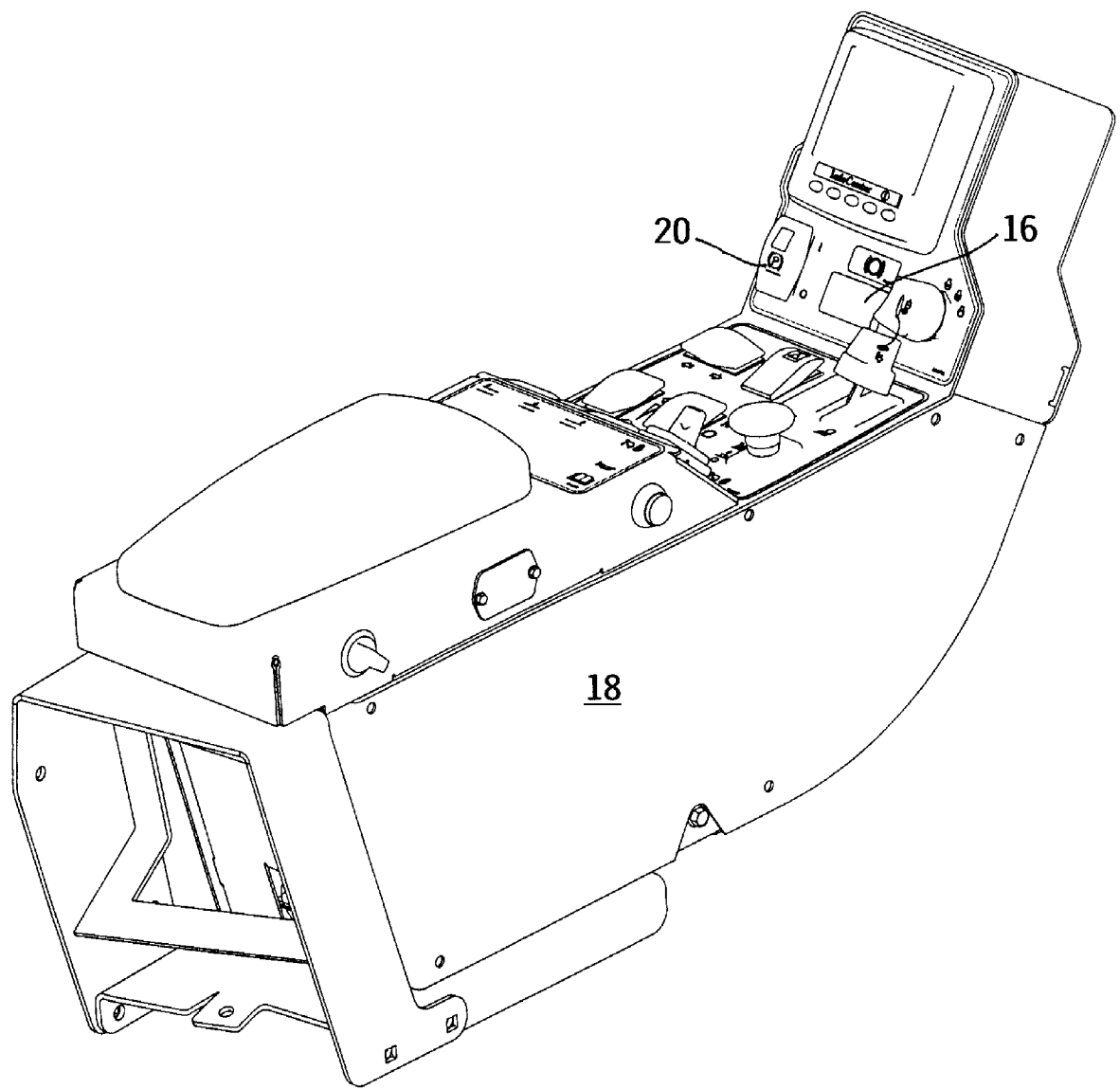
FIG. 2 is a perspective view of the control console of the mower of FIG. 1, particularly illustrating the switch used to actuate the auxiliary brake system of this invention.

Referring to FIG. 1, one type of a grounds maintenance vehicle that can be equipped with the auxiliary brake system is a commercial riding mower 2. Mower 2 has a chassis or frame 4 that carries a plurality of cutting decks 6 whose rotary blades (not shown) along with decks 6 themselves are in a staggered, gang configuration relative to one another to cut a single unbroken and wide swath of grass during each pass of mower 2 over a turf surface. An operator's station 7 provided on frame 4 carries a seat 8 for supporting an operator who rides on mower 2 while operating mower 2.

A pair of front wheels 10 (only one of which is shown in FIG. 1) and a pair of rear wheels 12 (only one of which is shown in FIG. 1) are carried on frame 4 to support frame 4 for rolling over the turf surface. A prime mover (not shown), such as but not limited to an internal combustion engine, is provided on frame 4 beneath a cowl or hood 14 behind operator's station 7. As shown herein, mower 2 is typical of a mower known as the Groundsmaster® 5900 which is manufactured and sold by The Toro Company, the assignee of this invention. However, this invention is not limited to this particular mower or to mowers generally, but may be used on any grounds maintenance vehicle having a hydrostatic traction drive system that carries some type of implement that performs a ground or turf grooming or working action.

As just noted, mower 2 has a hydrostatic traction drive system that powers some or all of front wheels 10 and/or rear wheels 12. In this case, mower 2 powers all four wheels 10 and 12 in a four wheel drive (4WD) configuration. However, the traction drive system could be set up to provide two wheel drive (2WD) only or to normally provide 2WD but to permit on demand 4WD. The hydrostatic drive system has at a minimum at least one hydraulic pump that is driven directly or indirectly by the prime mover and at least one hydraulic motor for powering at least one pair of wheels 10 and 12, though the number of pumps and motors that are used can be varied. In mower 2, a single hydraulic pump sends fluid flow to four individual hydraulic motors, one for each of the front wheels 10 and one for each of the rear wheels 12 in the 4WD configuration.

The hydrostatic traction drive system used in mower 2 is under the control of the operator using a typical accelerator control, e.g. a treadle type foot pedal, that is provided at the operator's station, namely a control that allows the operator to put the swashplate of the pump into a variable forward drive position, a variable reverse drive position, or in neutral. The accelerator control can be coupled to the swashplate mechanically, or electrically, or a combination of both. Such a hydrostatic drive system obviously provides hydrostatic dynamic braking. The traction drive system of mower 2 is designed to propel mower 2 at a top speed of approximately 20 mph in a transport mode and at a top speed of approximately 11 mph in an operational, grass cutting mode.

The auxiliary brake system of this invention that is added to mower 2 is a prime mover kill device 16, such as but not limited to a push button switch, which is placed on a control console 18 at operator's station 7 within convenient reach of an operator who is seated in seat 8. Kill device 16 can be operated incrementally by the operator in a sequential fashion by pressing on kill device and then quickly releasing it and by then repeating that action. For each incremental actuation of kill device in this manner, the electronic controller that regulates the operation of the prime mover will quickly reduce the rotational speed of the prime mover by a predetermined small amount, e.g. 100 rpm. Thus, if the operator presses and quickly releases kill device 16 five times in a row and then stops, the electronic controller will reduce the rotational speed of the prime mover by 500 rpm. Since the hydraulic flow output of the pump in the hydrostatic traction drive system is also dependent upon the rpm of the prime mover, a reduction of the prime mover rpm will reduce the flow output even without a change in the swashplate position, thus leading to a slowing in the hydraulic motors and a slowing of the wheels connected to such motors through the dynamic braking inherent in a hydrostatic traction drive system. In effect, kill device 16 in the auxiliary brake system is another way to access and utilize dynamic braking should the pump swashplate fail to respond to the accelerator control.

By being able to decrement or decrease the prime mover rotational speed in small discrete amounts in a first mode through sequential activations of kill device 16, the operator has graduated control over the auxiliary brake system in terms of how fast he or she wants to slow mower 2. The operator can effectively choose how long he or she wants to bring mower 2 to a full stop. Activating kill device 16 enough times to reduce the prime mover speed to 0 rpm will completely stop the prime mover and all hydraulic flow through the hydrostatic traction drive system. Thus, the dynamic braking effect in this complete shut down of the prime mover will then bring mower 2 to a full stop. Such a kill device will meet the regulations in some jurisdictions requiring an auxiliary brake device in outdoor ground maintenance vehicles and can be used in a situation where the usual dynamic brake system fails by providing an alternative way for the operator to access the dynamic braking effect found in a hydrostatic traction drive system.

The dynamic braking provided by the hydrostatic traction drive usually acts as the service brake system for mower 2 with no separate drum or disc brakes being present on wheels 10 and 12 as such drum or disc brakes are not needed when the traction system operates normally. Thus, the auxiliary brake system formed by kill device 16 acts as a second braking system that the operator can use to slow or stop mower 2 when there is some malfunction in the traction system and the dynamic braking effect initiated by a return towards neutral of the pump swashplate fails for some reason.

Preferably, kill device 16 can be actuated in a second mode to bring the prime mover to a full stop. Rather than having to sequentially activate kill device 16 a number of times to incrementally decrement the prime mover speed until it reaches zero, the operator can simply activate and then hold kill device 16 in the activated position for longer than a predetermined period of time, e.g. up to 3 seconds or so. The electronic controller will be programmed to understand that this single prolonged or held actuation of kill device 16 signals a desire by the operator to come to a full stop as soon as possible and will act accordingly, namely by reducing the prime mover speed to zero immediately. In this case, the dynamic braking effect that is energized by shutting down the prime mover will quickly stop mower 2 without the gradual reduction in speed that would have been obtained by sequential actuation of kill device 16. However, the immediate full stop ability provided by the single prolonged actuation of kill device 16 does not in any way take away the ability of the operator to graduate or more slowly stop mower 2 if he or she wishes using sequential actuation of kill device 16.

The prime mover speed control provided by kill device 16 is in addition to the prime mover control that is provided by the usual throttle of mower 2. However, it differs in a number of respects from the throttle. For one thing, it works independently of the throttle without requiring any change in the throttle position. In addition, the electronic controller is programmed to reduce the speed of the prime mover more quickly through operation of kill device 16 than through operation of the throttle. If the throttle were retarded sufficiently to effect a small reduction in prime mover speed, the electronic controller will do this more slowly than when kill device 16 signals for a similar decrease in prime mover speed. Finally, unlike the throttle which can be used by the operator to both increase and decrease the prime mover speed, the actuation of kill device 16 can only decrease the prime mover speed.

Various alternatives could be implemented for how kill device 16 provides the graduated braking and full stop capabilities of the auxiliary brake system of this invention. One such alternative is making the amount of speed reduction depend on how long kill device 16 is depressed. In this scenario, each time kill device 16 is pressed, held and released, the prime mover speed will start decreasing at the moment kill device 16 is pressed, will continue decreasing while kill device 16 is held, and will then stop decreasing when kill device 16 is released to hold the prime mover speed at whatever speed it had at the moment of release of kill device 16. Pressing kill device 16 again will continue the engine speed deceleration. Additionally, an auto-kill speed of the prime mover can be pre-determined and programmed into the controller. Once the actual speed of the prime mover arrives at the predetermined auto-kill speed, either by depressing kill device 16 intermittently or continuously, the prime mower will automatically go to kill to stop the machine. For instance, if the set-point kill speed is 1200 rpm, once the prime mover speed decelerates to this speed, the prime mover will automatically go to kill to stop the machine even if kill device 16 is released by the operator thereafter. In order to restart the machine, the key will need to be cycled OFF and back ON in order to prevent any non-intentional machine movement upon restart.

Any of the described variations of the auxiliary brake system of this invention described above can also integrate an automatic operation of the parking brake when the auxiliary brake system has reduced the engine speed to zero or near zero. For example, assume the operator has initiated engine shut down in the manner described in the preceding paragraph by pressing and holding kill device 16, either intermittently or continuously, until the engine speed arrives at the predetermined auto-kill speed that has been programmed into the controller, e.g. 1200 rpm in the above example but capable of being set to any desired auto-kill speed. At this point, the controller automatically transmits an engine kill signal to the engine to stop the engine and bring mower 2 to a halt. When the engine speed in this auto-kill segment of the control process reaches a very low speed, e.g. 100 rpm or so, the controller can then automatically engage the parking brake system for the operator through any suitable, e.g. electric or hydraulic, actuator to prevent the operator from having to manually set the parking brake. Again, the parking brake system has not been used as an emergency auxiliary brake system as it remains off during approximately all of the engine speed run down toward zero with hydrostatic dynamic braking acting as the service brakes. The parking brake system only comes on at very low speeds approaching or equal to zero simply to relieve the operator of the burden of having to remember to set the parking brake system.

Thus, this invention relates to a simple control that can be actuated by the operator to slow or stop the prime mover that drives the pump of the hydrostatic traction drive system of mower 2 as an alternative way to take advantage of the dynamic braking inherent in such a drive system. It can be used as the auxiliary brake system in the event there is some failure in the ability to control the swashplate of the pump through the usual accelerator control. Moreover, it does not rely upon the actuation of the parking brake system to stop the vehicle but acts independently of the parking brake system. Thus, the life of the parking brake system is not unduly shortened. If mower 2 is configured with a manual only parking brake system rather than using an automatically applied parking brake system, the normal or usual parking brake system provided on mower 2 can be activated in its normal manner, e.g. by manual actuation by the operator using a separate parking brake switch 20 on control console 18 or parking brake lever or pedal, as mower 2 approaches or has come to a full stop.

Various modifications of this invention will be apparent to those skilled in the art. Thus, the scope of this invention is not to be limited to the details of the embodiment of the invention disclosed herein. Instead, the scope of this invention is to be limited only by the appended claims.

The invention claimed is:

1. An outdoor grounds maintenance vehicle, which comprises:
    (a) a frame supported for movement over a ground or turf surface by a plurality of ground engaging wheels, the frame carrying a prime mover, a throttle for establishing a rotational speed of the prime mover, a seat for an operator, and an implement for performing a grooming or working operation on the ground or turf surface;
    (b) a hydrostatic traction drive system powered by the prime mover and operatively coupled to at least one wheel for self-propulsion of the frame over the ground or turf surface, the drive system providing hydrostatic dynamic braking for slowing or stopping the frame during operation of the vehicle; and
    (c) an auxiliary brake system having a prime mover kill device that is separate from the throttle and that provides graduated control by the operator of the rotational speed of the prime mover to reduce the rotational speed of the prime mover from a predetermined value as established by the throttle.

2. The vehicle of claim 1, wherein the kill device is configured to reduce the rotational speed of the prime mover to slow the vehicle without bringing the vehicle to a full stop.

3. The vehicle of claim 2, wherein the kill device is further configured to reduce the rotational speed for the prime mover from the predetermined value to zero substantially immediately.

4. The vehicle of claim 1, wherein the kill device is configured to reduce the rotational speed of the prime mover to slow the vehicle during a time when the kill device is pressed and held by the operator.

5. The vehicle of claim 4, wherein the kill device will end the reduction of the rotational speed of the prime mover when the kill device is released by the operator and then maintain the rotational speed of the prime mover at a rotational speed the prime mover had when the operator released the kill device.

6. The vehicle of claim 1, wherein the auxiliary brake system has an auto-kill speed setting and initiates a complete reduction of the rotational speed of the prime mover to zero when the rotational speed of the prime mover reaches the auto-kill speed setting.

7. The vehicle of claim 1, wherein the auxiliary brake system automatically engages a parking brake system that is separate from the auxiliary brake system when the rotational speed of the prime mover substantially approaches or reaches zero.

8. The vehicle of claim 1, wherein the amount of reduction in speed of the prime mover is proportional to how long the kill device is depressed.

9. The vehicle of claim 3, wherein the rotational speed of the prime mover is reduced to zero substantially immediately by activating and holding the kill device for longer than a predetermined period of time.

10. An outdoor grounds maintenance vehicle, which comprises:
(a) a frame supported for movement over a ground or turf surface by a plurality of ground engaging wheels, the frame carrying a prime mover, a throttle for establishing a rotational speed of the prime mover, a seat for an operator, and an implement for performing a grooming or working operation on the ground or turf surface;
(b) a hydrostatic traction drive system powered by the prime mover and operatively coupled to at least one wheel for self-propulsion of the frame over the ground or turf surface, the drive system providing hydrostatic dynamic braking for slowing or stopping the frame during operation of the vehicle; and
(c) an auxiliary brake system having a prime mover kill device that is separate from the throttle and that provides graduated control by the operator of the rotational speed of the prime mover to reduce the rotational speed of the prime mover from a predetermined value as established by the throttle; and
(d) a parking brake system that is separate from the auxiliary brake system, wherein the parking brake system and the auxiliary brake system can be activated independently of each other.

11. The outdoor grounds maintenance vehicle of claim 10, wherein the kill device is configured to reduce the rotational speed of the prime mover to slow the vehicle without bringing the vehicle to a full stop.

12. The outdoor grounds maintenance vehicle of claim 11, wherein the kill device is further configured to reduce the rotational speed for the prime mover from the predetermined value to zero substantially immediately.

13. The outdoor grounds maintenance vehicle of claim 10, wherein the kill device is configured to reduce the rotational speed of the prime mover to slow the vehicle during a time when the kill device is pressed and held by the operator.

14. The outdoor grounds maintenance vehicle of claim 13, wherein the kill device will end the reduction of the rotational speed of the prime mover when the kill device is released by the operator and then maintain the rotational speed of the prime mover at a rotational speed the prime mover had when the operator released the kill device.

15. The outdoor grounds maintenance vehicle of claim 10, wherein the auxiliary brake system has an auto-kill speed setting and initiates a complete reduction of the rotational speed of the prime mover to zero when the rotational speed of the prime mover reaches the auto-kill speed setting.

16. The outdoor grounds maintenance vehicle of claim 13, wherein the amount of reduction in speed of the prime mover is proportional to how long the kill device is depressed.

17. The outdoor grounds maintenance vehicle of claim 12, wherein the rotational speed of the prime mover is reduced to zero substantially immediately by activating and holding the kill device for longer than a predetermined period of time.

* * * * *